April 16, 1963 B. G. FORMAN 3,085,899
MEANS AND METHOD FOR FORMING ELECTRICAL COMPONENTS
Filed May 23, 1960 2 Sheets-Sheet 1
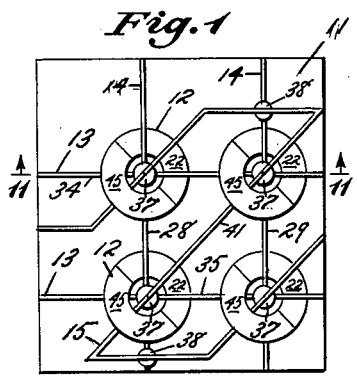
Fig.1
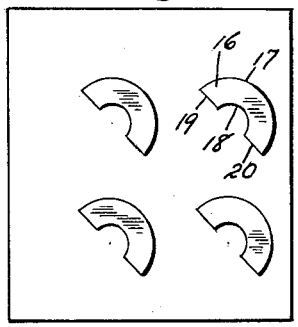
Fig.2
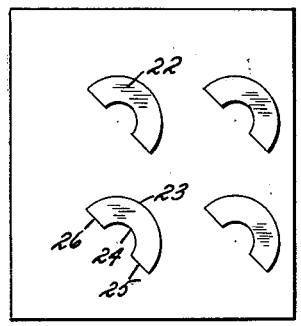
Fig.3
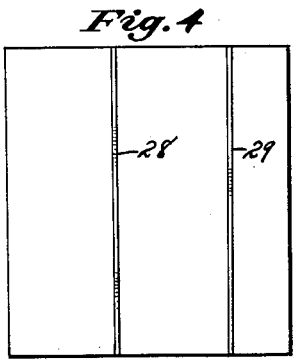
Fig.4
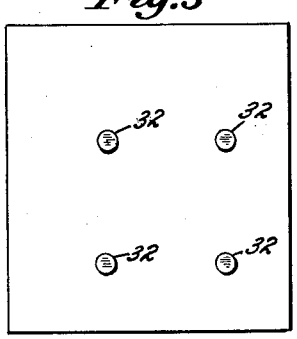
Fig.5
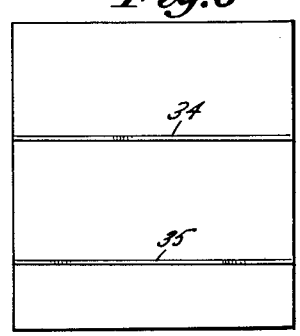
Fig.6
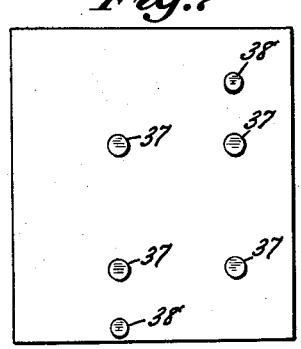
Fig.7
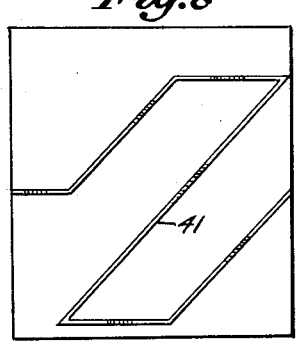
Fig.8
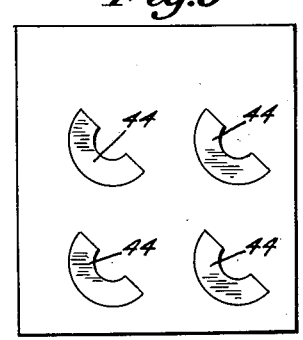
Fig.9
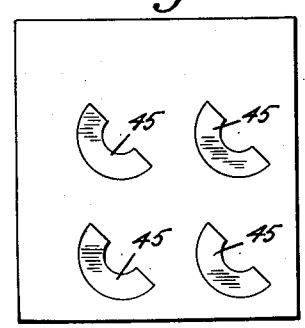
Fig.10
Fig.11
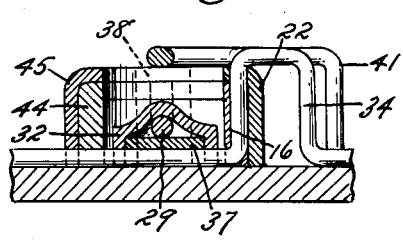

April 16, 1963  B. G. FORMAN  3,085,899
MEANS AND METHOD FOR FORMING ELECTRICAL COMPONENTS
Filed May 23, 1960  2 Sheets-Sheet 2

United States Patent Office 3,085,899
Patented Apr. 16, 1963

3,085,899
MEANS AND METHOD FOR FORMING
ELECTRICAL COMPONENTS
Benjamin G. Forman, Massapequa, N.Y., assignor to
National Resistance Corporation, Pearl River, N.Y., a
corporation of New York
Filed May 23, 1960, Ser. No. 31,129
3 Claims. (Cl. 117—38)

This invention relates generally to the field of electronics, and more particularly to an improved means and method for forming specific components produced in a manner which eliminates a large degree of hand labor. While particularly adapted for the manufacture of an electrical component known as a computer memory matrix, the means and method disclosed has wide application to a number of other similar or analogous structures.

In digital or binary type computers, or those having digital or binary sections, it is known to employ one or more means for storing instantly accessible information known as a memory matrix. An individual matrix consists of a large plurality of small magnetic annularly-shaped members, each being capable of being magnetized in either of two polarities. The material from which the individual annular members are formed is such that a given quantity of electricity is necessary to change the polarity from positive to negative, or vice versa. The members are usually arranged in rank and file, corresponing to $x$ and $y$ coordinates, and a series of wires are passed through the openings in the individual members at right angles to each other. A single wire will normally pass through all of the openings of the members situated in any given rank or file, and magnetism is altered in each individual member by selecting the proper ordinate and abscissa, and placing a current on each wire. The two currents will combine to provide sufficient elecrical magnetic field to alter the magnetism of the individual member, but since the wires cross at a point where they pass through the desired member, the other members are left unaffected. A third or sensing wire passes through all of the members at a forty-five degree angle, this wire being employed to determine the polarity of a selected member when current is applied on the wires corresponding to the proper ordinate and abscissa.

It will readily be appreciated that the manufacture of a relatively small memory matrix having only several thousand such members is a time-consuming task, since three wires must be threaded through each of the individual magnetic members, usually by hand.

It is the principal object of the present invention to provide an improved method for making memory matrices and other electrical components of similar complexity in which the above-described hand labor has been eliminated.

Another object of the invention lies in the provision of a memory matrix of the class described which may be formed by successive deposition and firing of ceramic materials in predetermined patterns in such shape and sequence that the electrical equivalent of the prior art structure is obtained without the necessity of threading individual wires through individual magnetic members.

Still another object of the invention lies in the provision of a means and method capable of achieving the above end, whereby the cost of fabrication of the desired electrical components may be of a very low order, permitting consequent wide sale, distribution and use.

A feature of the invention lies in the use of ceramic frits as insulative material, thereby permitting thicknesses of insulation in the range of several microns.

Another feature of the invention lies in the fact that all of the individual parts comprising the memory matrix are deposited by ceramic screening, thereby permitting a memory matrix of extremely thin dimensions.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a view in elevation showing a completed embodiment of the invention.

FIGURE 2 is a view in elevation showing a first deposition of material in accordance with the present method.

FIGURE 3 is a similar view in elevation showing a subsequent deposition of material.

FIGURE 4 is a view in elevation showing a third deposition of material.

FIGURE 5 is a view in elevation showing a fourth deposition of material.

FIGURE 6 is a view in elevation showing a fifth deposition of material.

FIGURE 7 is a view in elevation showing a sixth deposition of material.

FIGURE 8 is a view in elevation showing a seventh deposition of material.

FIGURE 9 is a view in elevation showing an eighth deposition of material.

FIGURE 10 is a view in elevation showing a ninth deposition of material.

FIGURE 11 is a fragmentary enlarged transverse sectional view as seen from the plane 11—11 in FIGURE 1.

Figure 12:
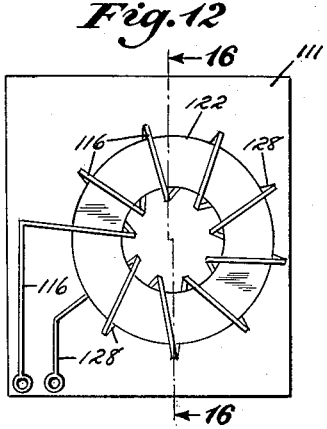
FIGURE 12 is a view in elevation showing a completed second embodiment of the invention.
Figure 13:
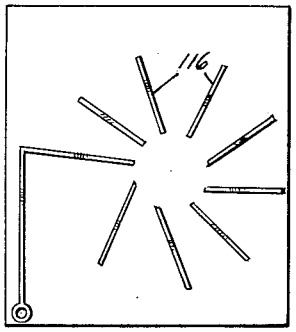
FIGURE 13 is a view in elevation showing a first deposition of material in accordance with the present method.
Figure 14:
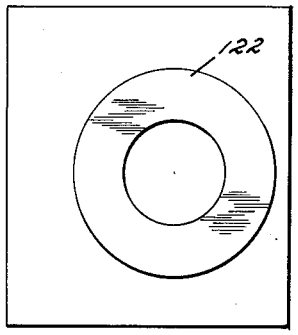
FIGURE 14 is a similar view in elevation showing a subsequent deposition of material.
Figure 15:
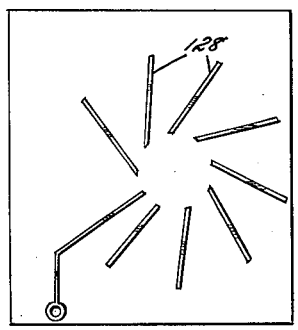
FIGURE 15 is a view in elevation showing a third deposition of material completing the second embodiment.
Figure 17:
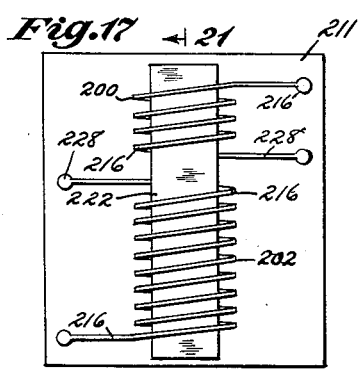
FIGURE 17 is a view in elevation showing a completed third embodiment of the invention.
Figure 18:
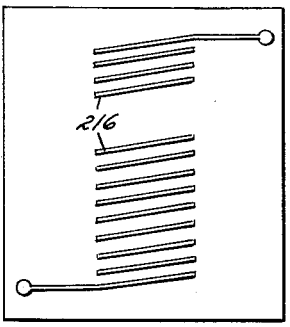
FIGURE 18 is a view in elevation showing a first deposition of material in accordance with the present method as applied to the third embodiment.
Figure 16:
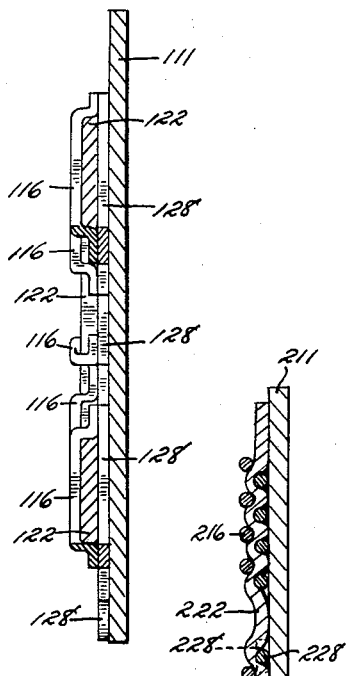
FIGURE 16 is a sectional view as seen from the plane 16—16 in FIGURE 12.
Figure 19:
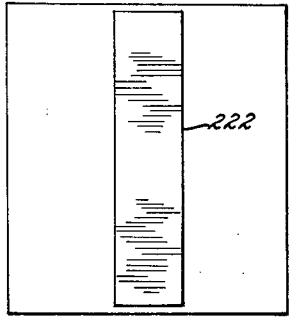
FIGURE 19 is a similar view in elevation showing a subsequent deposition of material.
Figure 20:
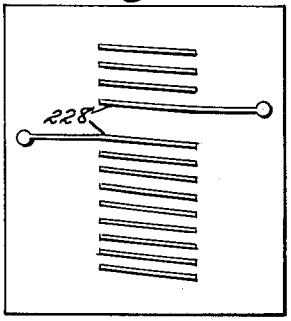
FIGURE 20 is a view in elevation showing a third deposition of material completing the third embodiment.
Figure 21:
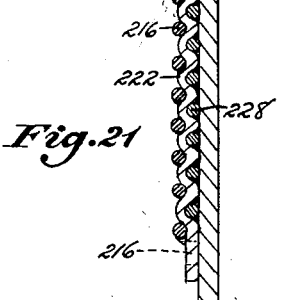
FIGURE 21 is a cross-sectional view of FIGURE 17 taken on the section 21—21 of FIGURE 17.

In accordance with the invention, the memory matrix in completed form is illustrated in FIGURE 1 of the drawing, wherein a ceramic or heat-resistant base 11 supports thereupon a plurality of magnetic ring members 12 through each of which there is passed a first or *x* coordinate wire 13, a second or *y* coordinate wire 14 and a continuous sensing wire 15, as is well known in the art. While four such ring members are shown in FIGURE 1, it will be understood by those skilled in the art to which the invention relates that in normal practice, a complete memory matrix may include many thousands of such ring members with corresponding wires 13–15 inclusive.

The ring members 12 and wires 13–15, inclusive, are formed by successive screen deposits of ceramic material, each deposit being individually fired prior to application of the next.

Referring to FIGURE 2, the first screening generally, indicated by reference character 16, is formed using powdered ferrite or other magnetic material in a suitable ceramic frit. This deposition forms approximately one-half of the ring members 12, and accordingly the deposit includes a plurality of individual areas, each of which is bounded by an outer curvilinear edge 17, an inner curvilinear edge 18 and rectilinear edges 19 and 20.

After deposition and firing of the first step shown in FIGURE 2, the ferrite material now in place is insulated by the second screening and firing shown in FIGURE 3. In this step, a corresponding number of insulative areas generally indicated by reference character 22 are deposited directly upon the ferrite-covered areas, each including an outer curvilinear edge 23, an inner curvilinear edge 24 and rectilinear edges 25 and 26.

Referring to FIGURE 4, after the second firing, the *x* coordinate wires 28 and 29 are then deposited and fired. In this case, the screening includes a frit of ceramic material and finely divided metal having electrically conductive properties. By comparing FIGURE 4 with FIGURE 1, it will be observed that the wires 28 and 29 overlie one portion of the first and second screening.

Referring to FIGURE 5, the third screening consists of placing small insulative areas 32 directly upon the wires 28 and 29. By comparing this figure with FIGURE 1, it will be observed that the areas 32 are deposited in the center of the still incompletely formed ring members 12.

Referring to FIGURE 6, the *y* coordinate wires 34 and 35 are next screened in a similar manner, the insulative areas 32 serving to prevent electrical contact between the *x* coordinate and *y* coordinate wires.

The sixth screening shown in FIGURE 7 includes the deposition of areas 37 corresponding to the areas 32, and additional areas 38 which will insulate the sensing wire 15 as yet undeposited.

Referring to FIGURE 8, the sensing wire screening indicated by reference character 41 is then made, and as seen in FIGURE 1, a forty-five degree angle is employed so that the wires 13–15, inclusive, may all overlie the one-half of the ring member 12 which has been deposited, while yet remaining electrically insulated from each other.

The eighth screening shown in FIGURE 9 includes the deposition of insulative areas 44 directly corresponding to those seen in FIGURE 3, the purpose being to prevent flow of any current from the wires 13–15 to the ring member 12.

The ninth and final screening corresponds to the first screening, and as seen in FIGURE 10 includes the depositing of a ferrite or magnetic layer 45 corresponding in thickness to that of the first screening. If desired, the precise arcuate dimension of the second and eighth screenings may be slightly less than that of the first and ninth screenings to permit actual contact of the two ferrite depositions, although this is not essential to assure electrical functioning.

With the completion of the ninth screening, the mechanical equivalent of passing three wires through each of the ring members 12 is achieved, since the ring member was formed by depositing one-half of the same, overlying the three wires, and finally depositing the remaining half. This technique avoids the necessity of threading a single wire, and permits a device in which the relative position of each of the parts comprising the matrix is permanently fixed as in a printed electrical circuit. The nine separate depositions and firings require a substantial period of time, but far less than that necessary for the hand operations used in the prior art, and in mass production, it is possible to fire a number of bases 11 in various stages of manufacture simultaneously, so that each individual base requires the equivalent in time of a single firing.

Turning now to the second embodiment of the invention, parts corresponding to those of the first embodiment have been designated by similar reference characters with the additional prefix "1."

The second embodiment of the invention differs from the first embodiment in being a relatively simple device taking the form of a toroidal inductor. The material of the first screening 116 is silver in a ceramic frit, while the second deposition 122 is of magnetic material. The third deposition 128 is again with silver, and is so positioned as to complete a circuit with the first deposition.

Turning now to the third embodiment of the invention, parts corresponding to those of the first embodiment have been designated by similar reference characters with the additional prefix "2."

In the third embodiment, the device formed is a transformer having a first or primary winding 200, and a secondary winding 202, made as in the case of the other embodiments by successive depositions of material in the manner described.

I wish it to be understood that I do not consider the invention limited to the precise details of structure shown and set forth in this specification, for obvious modifications will occur to those skilled in the art to which the invention pertains.

I claim:

1. In a method of making a memory matrix or similar article, the steps of: (1) providing a heat-resistant base; (2) depositing and firing upon said base a frit containing a magnetic oxide to form a semicircular form; (3) depositing and firing an insulating layer of frit upon said magnetic oxide; (4) depositing and firing a first conductor overlying said oxide; (5) depositing and firing an insulation upon said conductor; (6) depositing and firing a second conductor at substantially right angles with respect to said first-mentioned conductor; (7) insulating said second conductor by depositing and firing an insulative layer; (8) depositing and firing a third conductor at an angle with respect to said first and second conductors; (9) depositing and firing a semicircular insulating layer oppositely disposed with respect to said first-mentioned semicircular form to form a complete circle; and (10) depositing a layer of magnetic oxide in semicircular form upon said last-mentioned semicircular insulating layer.

2. In a method of making a memory matrix or similar article, the steps of: (1) providing a heat-resistant base; (2) depositing and firing upon said base a frit containing a magnetic material to form a semicircular form; (3) depositing and firing an insulating layer of frit upon said magnetic material; (4) depositing and firing a first conductor overlying said material; (5) depositing and firing an insulation upon said conductor; (6) depositing and firing a second conductor at substantially right angles with respect to said first-mentioned conductor; (7) insulating said second conductor by depositing and firing an insulative layer; (8) depositing and firing a third conductor at an angle with respect to said first and second conductors; (9) depositing and firing a semicircular insulating layer oppositely disposed with respect to said first-mentioned semicircular form to form a complete circle; and (10) depositing a layer of magnetic material in semicircular form upon said last-mentioned semicircular insulating layer.

3. In a method of making a memory matrix or similar article, the steps of: (1) providing a heat-resistant base; (2) depositing and firing upon said base a frit containing a magnetic material to form a plurality of semicircular forms; (3) depositing and firing an insulating layer of frit upon said magnetic material; (4) depositing and firing a first conductor overlying said material; (5) depositing and firing an insulation upon said conductor; (6) depositing and firing a second conductor at substantially right angles with respect to said first-mentioned conductor; (7) insulating said second conductor by depositing and firing an insulative layer; (8) depositing and firing a third conductor at an angle with respect to said first and second conductors; (9) depositing and firing a semicircular insulating layer oppositely disposed with respect to said first-mentioned plurality of semicircular forms to form a complete circle; and (10) depositing a layer of magnetic material in a plurality of semicircular forms upon said last-mentioned semicircular insulating layer.

References Cited in the file of this patent
UNITED STATES PATENTS

| | | |
|---|---|---|
| 2,877,144 | Iversen | Mar. 10, 1959 |
| 2,927,048 | Pritikin | Mar. 1, 1960 |